April 14, 1936.  C. BRYAN  2,037,310

FISH LURE

Filed Feb. 12, 1935

Inventor

Clare Bryan.

By Lacey & Lacey, Attorneys

Patented Apr. 14, 1936

2,037,310

UNITED STATES PATENT OFFICE 2,037,310

FISH LURE

Clare Bryan, Chicago, Ill.

Application February 12, 1935, Serial No. 6,215

10 Claims. (Cl. 43—42)

This invention is a fish lure, and has as its object the provision of an artificial bait which will attract game fish and which may be produced at a very low cost. The invention is illustrated in the accompanying drawing and consists in certain novel features which will be hereinafter first fully described and then particularly defined in the appended claims.

Figure 1:
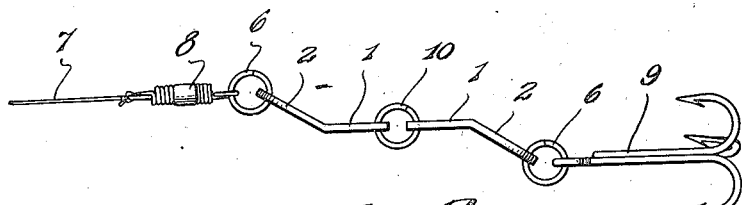
Figure 1 is an edge view of a lure or artificial bait embodying the invention.
Figure 2:
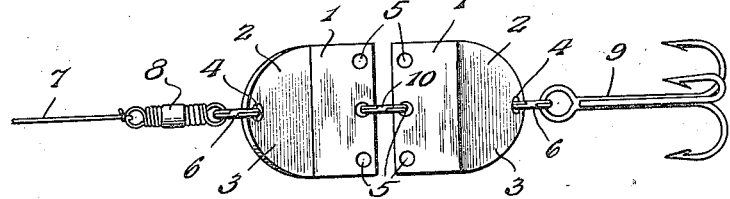
Figure 2 is a plan view of the same.
Figure 3:
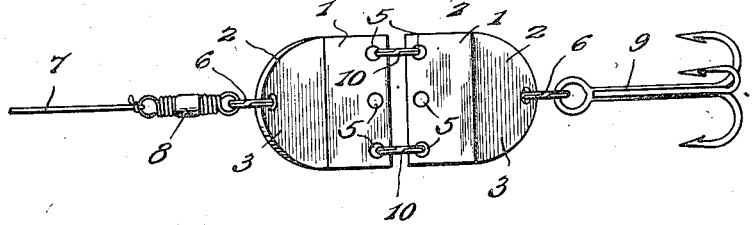
Figure 3 is a plan view showing a slight variation.

In Figures 1, 2 and 3, the device is shown as consisting of two similar members or sections preferably of thin metal having a straight-edge portion 1 and a round-ended portion 2 extending from the straight-edge member at an angle of about thirty degrees thereto. These members or sections are identical in form and size and may be readily stamped from a flat blank at very slight cost: At the center of each arcuate edge 3 is a single perforation 4 and along the straight edge of each member is a series of perforations 5, three being shown in the drawing. In assembling the parts, the members or sections have their straight side edges arranged in parallelism, as shown in Figures 2 and 3, but the round-edge end portions are so disposed as to extend in opposite directions, as clearly shown in Figure 1. Rings 6 are engaged through the respective openings 4 and the fish line 7 is provided with a swivel 8 which is engaged in the ring 6 associated with the upturned end portion 2, the other ring 6 carrying the fish hook shown at 9. The line 7, swivel 8, and hook 9 may, of course, be of any approved form and the swivel is employed to avoid tangling or twisting of the line. Other rings 10 are provided to be engaged in the perforations 5 so as to form a flexible connection between the two plate members or sections and a plurality of these rings will be supplied with the plate members so that the fisherman may connect the plate members with a single ring 10 at the centers thereof, as shown in Figure 2, or may connect them by two rings placed, respectively, near the end edges of the plate members, as shown in Figure 3. All the rings will be split rings so that they may be easily handled and engaged in or withdrawn from the openings of the metal plates, as will be understood.

Figure 4:
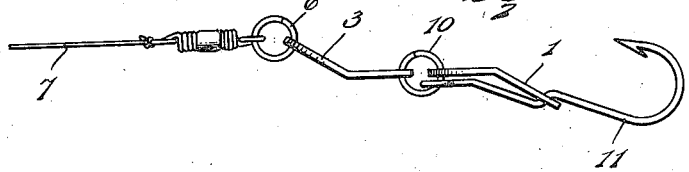
Figure 4 is an edge view showing a different manner of assembling the pivoted sections constituting the body of the lure.
Figure 5:
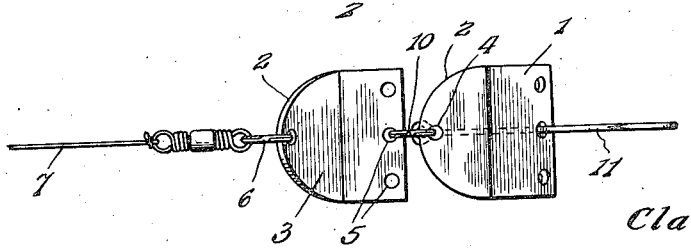
Figure 5 is a plan view of Figure 4.

In Figures 4 and 5 of the drawing I have shown the lure sections or plates assembled in tandem with both rounded edges 2 extending in the same direction and with the ring 10 extending through the perforation 4 of one section and the adjacent perforation 5 of the companion section. When the parts are assembled in this manner the rounded end portion 2 of one section projects or extends upwardly, while the straight edge portion 1 of the other section projects or extends downwardly. The shank of the hook 11 used in this form of the device is preferably so bent or shaped as to permit it to be inserted through the central perforation 4 of the rear section and beneath said section for connection with the ring 10, as best shown in Figure 4 of the drawing.

In all forms of the device, the leading end thereof is upturned, while the trailing end thereof is downturned, as clearly shown in Figures 1 and 4. As the device is drawn through the water or is presented to a current, the action of the water on the upturned front end will cause the device to oscillate and rock so that it has a wagging turning movement which will attract the attention of the fish. This wagging, rolling, swishing movement is accentuated by the downturned trailing end of the device, the leading end causing the stream to divide and flow around the edges of the main body of the device so that it will act on the downturned trailing end thereof to exaggerate the sidewise rocking or rolling movement. As the device is thus caused to oscillate and rock or roll, the sunlight will be deflected from its several faces and will create a sparkling effect which will further attract the fish, and the device may be finished in any desired style or color or combination of colors so that the fisherman may select that arrangement which may be, in his judgment, most suitable for the particular conditions in which he is fishing or the particular fish he is trying to catch. The triple prong hook shown in Figure 1 and the single prong hook shown in Figure 4 are to be furnished with each lure so that a fisherman can use whichever hook he desires when assembling the device. The device is exceedingly light and simple and may be produced at a very low cost.

Having thus described the invention, what is claimed as new is:

1. A fish lure comprising similar members each having an integral angularly disposed portion, a flexible connection between said members whereby one member will have an upturned end portion and the other member have a downturned end portion, and means for connecting a fish line to the upturned end portion and a fish hook to the downturned end portion.

2. A fish lure comprising members having plane surfaces and each having a straight edge and a round edge at opposite sides, the round edge portion extending obliquely from the remaining portion, and the members being arranged with one round edge end portion extending upwardly and the other round edge portion extending downwardly.

3. A fish lure comprising members having plane surfaces and each having a straight edge and a round edge at opposite sides, the round edge portion extending obliquely from the remaining portion and the members being arranged with one round edge end portion extending upwardly and the other round edge portion extending downwardly, perforations in the end portions and adjacent the straight edge portions, and rings engageable in said perforations whereby to flexibly connect a fish line to the upturned end and a hook to the downturned end and to flexibly connect the two members.

4. A fish lure comprising members having plane faces and each having a straight edge and a round edge at opposite sides, the round edge portion extending obliquely from the remaining portion and the members being arranged with one round edge end portion of one member extending upwardly and the straight edge of the other member extending downwardly.

5. A fish lure comprising members having plane faces and having an upturned leading end and a downturned trailing end, each member having a straight edge and a round edge at opposite sides, perforations in the end portions and adjacent the straight edge portion, rings engageable in said perforations whereby to flexibly connect a fish line to the upturned end, and means to flexibly connect the two members.

6. A fish lure comprising pivotally connected interchangeable and reversible sections, each section being provided with an integral deflected portion, means for connecting a fish line to the deflected portion of one section, and a fish hook carried by the deflected portion of the other section.

7. A fish lure comprising companion sections of like formation, each having an angularly disposed portion, means for pivotally and detachably connecting said sections, whereby the angular portion of one section will constitute an upturned leading edge and the angular portion of the other section a downturned trailing edge, means for connecting a fish line to the leading edge, and a fish hook carried by the trailing edge, said sections being interchangeable.

8. A fish lure comprising companion sections having plane faces, one of the sections being provided with an integral upturned leading edge and the other section with an integral downturned trailing edge, means for pivotally and detachably connecting said sections, means for connecting a fish line to the free end of one section, and a fish hook carried by the free end of the other section, said sections being reversible and interchangeable.

9. A fish lure comprising companion sections having plane faces and each provided with an angular portion, a ring forming a pivotal connection between the plane faces of said sections, means for attaching a fish line to the angular portion of one section, and a fish hook extending through the angular portion of the other section and connected with said ring.

10. A fish lure comprising companion sections having plane faces and each provided with an angular portion, said sections being assembled with the adjacent plane faces thereof in alinement, means for pivotally connecting the sections at said plane faces, means for connecting a fish line to the angular portion of one of the sections, and a fish hook connected with the angular portion of the other section, said sections being interchangeable and reversible.

CLARE BRYAN.